March 15, 1966 C. S. BIECHLER ETAL 3,240,984

HIGH FREQUENCY APPARATUS

Original Filed Jan. 9, 1961

INVENTORS
CHARLES S. BIECHLER
JOHN W. GRASS
OSCAR C. LUNDSTROM
BY [signature]
ATTORNEY United States Patent Office 3,240,984
Patented Mar. 15, 1966

3,240,984

HIGH FREQUENCY APPARATUS

Charles S. Biechler, Los Altos, John W. Grass, Menlo Park, and Oscar C. Lundstrom, Sunnyvale, Calif., assignors to Varian Associates, Palo Alto, Calif., a corporation of California Original application Jan. 9, 1961, Ser. No. 81,455. Divided and this application Jan. 7, 1965, Ser. No. 439,115
3 Claims. (Cl. 315—5.48)

Figures 1, 2, 3, 4:
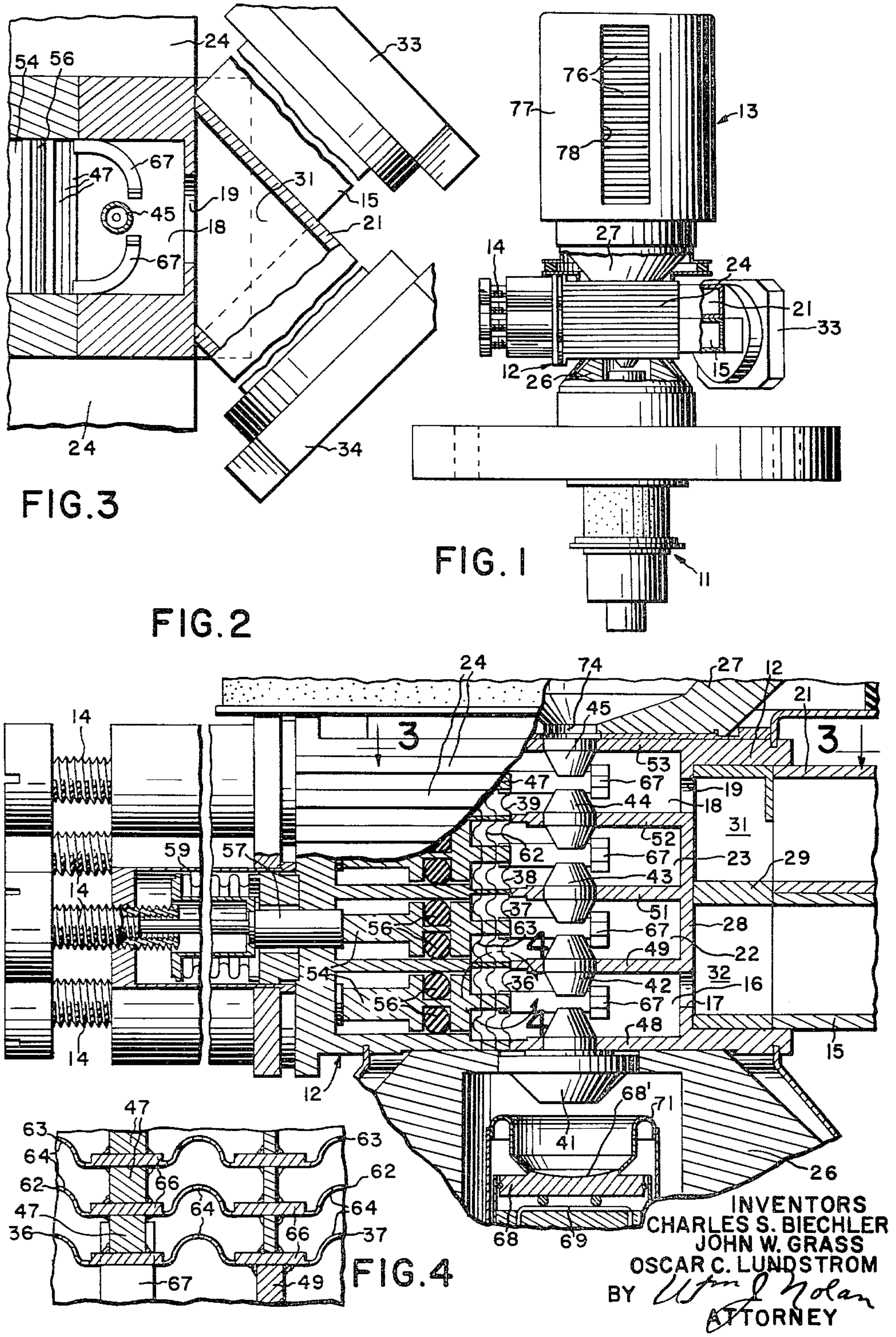

The present invention relates in general to high frequency tube apparatus and, more specifically, to a novel high-frequency, high-powered, air-cooled, long-life velocity modulation tube of relatively small size and weight.

This application is a divisional application of U.S. Serial No. 81,455, filed January 9, 1961, by Charles S. Biechler et al. and assigned to the same assignee as the present invention, now abandoned.

Heretofore, multicavity high-power klystron amplifiers which are capable of amplifying, for example, frequencies of about 8000 megacycles were water-cooled and had a beam-guidance magnetic field produced by electromagnets. The water-cooling insured low temperature operation of the tube parts, especially the collector and the tube tuning parts, while the electromagnets constrained the electron beams to their required paths to keep the body currents low. The use of such water-cooling and electromagnets resulted in relative ease of klystron design and substantial over-all weight increase, the electromagnet, for example, adding between 60 to 70 pounds to the klystron tube which, by itself, weighed between 3 to 6 pounds.

The present invention provides a high power multicavity klystron amplifier capable of delivering continuous output power in excess of one kilowatt at frequencies of, for example, about 8000 megacycles while being repeatedly tunable through a 500 megacycle band. The klystron has a beam-guidance magnetic field produced by a permanent magnet, thereby eliminating the need for an electromagnet and its power supply. The klystron is air-cooled to reduce the weight and thus lend itself more suitable for transportable communications use. For example, the over-all weight of one tube including magnets made in accordance with the present invention is about 40 pounds. In order that the klystron have a high amplification factor, the klystron has a number of successive tunable integral resonant cavities, for example, four. To enable the most efficient use of the permanent magnet, the cavities are made narrow to ensure the shortest magnet gap spacing and thus the strongest possible magnetic field. Also, since the distance between the input and output cavities is short, a novel waveguide coupling arrangement is provided for the klystron which allows the body of the tube to be efficiently air-cooled. In addition, the electron gun has a novel construction wherein the cathode emission is increased in order to produce greater high-frequency power.

The principal object of the present invention is to provide a novel high-frequency, high-power, high gain amplifier tube having a long life and exceptionally broad frequency tuning range, which tube is preferably air-cooled and has a permanent magnet for producing a beam-guidance field.

One feature of the present invention is the provision of a narrow integral tunable cavity having a flexible thin side wall provided with a heat sink for cooling said wall more efficiently.

Another feature of the present invention is the provision of one or more flexible metallic diaphragms connected to said heat sink to conduct the heat away from the heat sink.

Another feature of the present invention is the provision of air-cooling fins on the body of a high power, high-frequency tube in conjunction with a permanent magnet.

Other features and advantages of the present invention will become apparent upon a perusal of the following specifications taken in connection with the accompanying drawings wherein:

FIG. 1 is an elevation view in partial section of a novel klystron embodying the present invention, FIG. 2 is a partial longitudinal section view of the klystron body which houses the high frequency interaction means, FIG. 3 is a partial view of the klystron taken along line 3—3 of FIG. 2, and FIG. 4 is a detailed view of the flexible wall enclosed by circle 4—4 of FIG. 3 shown rotated 90°.

Referring now to the drawings, there is shown a klystron amplifier including an electron gun assembly 11 for projecting an electron beam through the klystron body section 12 which houses the high-frequency tunable cavity resonators and a collector assembly 13 for cooling the electrons after they have passed through the body section 12. The cavity resonator tuning means includes the tuning screws 14 which are accessible on one side of the body section 12. The high-frequency signal to be amplified is coupled through a waveguide 15 into the first cavity resonator 16 in body section 12 through an aperture 17 disposed on the opposite side from the tuning screws 14 while the amplified high-frequency signal is coupled out from the last cavity resonator 18 through an aperture 19 into an output waveguide 21. Two other cavity resonators 22 and 23 are disposed between resonators 16 and 17. Cooling fins 24 are disposed on the two remaining opposite sides of the klystron body section 12 to provide sufficient cooling surface for the klystron body.

This klystron utilizes a magnetic field guidance for the electron beam as the beam passes through the cavity resonators, this field being supplied by a permanent magnet means including two substantially horseshoe sections or halves (not shown) arranged to mate with the pole pieces 26 and 27. To ensure the strongest possible magnetic field between pole pieces 26 and 27 the over-all distance from input cavity 16 to output cavity 18 is made as short as practicable. This is accomplished by making the resonant cavities 16, 22, 23, and 18 as narrow as possible while still insuring their capability of resonating at the proper frequencies. As a result, the total space into which the waveguides 15 and 21 must fit is limited. The waveguides are fixed to one wall 28 of the body 12 and since the length of body 12 is short they are disposed adjacent to each other with partition 29 separating the two. When waveguides are disposed adjacent each other, additional sections cannot be satisfactorily added since there is no room on the exterior of the waveguides for placing adequate flanges to which such section may be attached. If the flanges are not adequate, high-frequency energy will radiate from the output waveguide sections into the input waveguide sections, and noise will be produced in the system.

The present klystron has a novel arrangement for the input and output waveguide which is shown in FIG. 3. The waveguides 15 and 21 extend from the wall 28 of body 12 so that a wedge-shaped transition zone 31 is formed at the end of the waveguide 21 just exterior of its coupling aperture 19, and a similar wedge-shaped transition zone 32 is formed at the end of the waveguide 15 just exterior of its coupling aperture 17. The waveguides 15 and 21 extend in a different angular direction from wall 28. Therefore, at a short distance from the body 12 there is ample room around the waveguide so that flanges 33 and 34 can be placed on waveguides 15 and 21 respectively and a suitable vacuum tight high-frequency window (not shown) is placed in each flange.

As mentioned above, this tube is capable of being tuned over a broad band. Therefore, the cavities are tuned by making one narrow side wall 36, 37, 38, and 39 in each cavity 16, 22, 23, and 18, respectively, flexible so that the walls are movable toward and away from the electron beam which passes through drift tube sections 41, 42, 43, 44, and 45. Since the tube must have broad band tuning, the walls 36, 37, 38, and 39 must be capable of flexing over a considerable distance. Therefore, in order that the tube can be tuned repeatedly without the walls incurring fatigue failure before the tube life has expired, the flexible walls are made very thin and from a very ductile and good-conductor metal, such as copper. Even though the flexible wall is made of a good conductor, there is considerable high-frequency heating of the flexible walls. Since they are thin this heat flow path is small, and therefore the walls will become very hot. A heat sink in the form of a relatively massive metal bar 47 is placed on the center of each wall 36, 37, 38, and 39 so that the heat energy now travels a path through the walls which is half as long, thereby helping to cool the walls. The edges of the walls 36, 37, 38, and 39 being fixed to end walls 48 and 49 of cavity 16, end walls 49 and 51 of cavity 22, end walls 51 and 52 of cavity 23, and end walls 52 and 53 of cavity 18, respectively, are adequately cooled, but the bars 47 being disposed within a vacuum need an efficient heat path to keep them cool. Although each bar 47 is connected to a tuning screw 14 which is outside the vacuum envelope, the heat path is very long and does not provide efficient cooling. This heat path from the bar 47 may be traced through guide 54 which is supported within the vacuum envelope of the klystron on sapphire bearing rods 56 and adjustment rod 57 which is threaded at one end into internal screw threads on the tuner screw 14. Screw 14 also has external screw threads which coact with the body 12. The internal screw threads have a different pitch than the external screw threads, so that rod 57 will move into and out of the body section 12 as the screw 14 rotates, causing the guide 54 to follow. A tubular bellows 59 is disposed around the rod 57 to provide the necessary flexibility in the vacuum wall of the klystron. Since the total length of the body 12 is short the tuning screws 14 are staggered. Thus, in order to cool the bar 47 effectively, additional flexible members 62 and 63 which guide the heat to the end walls are disposed behind flexible walls 36, 37, 38, and 39.

For ease of construction, walls 36, 37, 38, and 39 are composed of one corrugated metal sheet with the areas 64 (FIG. 4) which are shown disposed between end walls 48, 49, 51, 52 and 53 and associated bars 47 preferably are made thinner than the areas 66 which are brazed to the end walls and bars 47 since most of the flexing of the wall is performed in these areas 64. The corrugated metal sheet with two different thicknesses allows the metal to be more readily brazed than a corrugated sheet metal having one very thin thickness which must correspond to the thickness of areas 64. Flexible members 62 and 63 are made similar to the corrugated sheet metal which forms flexible walls 36, 37, 38, and 39.

Capacitive tuning horns 67 (FIG. 3) are attached to each end of bars 47 making two horns for each cavity 16, 18, 22, and 23 which further increases the tuning rate of the cavity as the flexible walls are moved, thereby increasing the tuning band of the klystron tube.

The tube has a novel electron gun structure which aids in increasing its high-frequency power. The cathode 68 is preferably made of porous tungsten and impregnated with suitable oxide mixes, as is well known in the art, with a pancake type heater 69 suitably supported behind the cathode. A focusing electrode 71 is disposed in front of the cathode 68 so that the part of the cathode disposed around its periphery is shielded from the positive potential of the anode 41. This outside part of the cathode is difficult to maintain at the uniform temperature at which the central portion 68′ is maintained, and therefore the emissive current density of this part is lower than the emissive current density of the central portion 68′. This arrangement of the focusing electrode permits only the electrons emitted from portion 68′ to be focused into the beam, thereby increasing the current density of the beam.

A high density beam when it is collected by a collector liberates large amounts of energy as heat on a smaller area thereby causing localized melting of the collector. In order not to melt the collector, the energy must be spread over a large area. This is accomplished by shaping the magnetic field so that it helps defocus the beam in the collector region as well as guide the beam through the body 12. The magnetic pole pieces 26 and 27 (FIG. 4) which are disposed at each end of the drift space are made with apertures 73 and 74, respectively, through which the beam passes. Aperture 73 being larger than aperture 74 has disposed therein drift tube section and anode 41 made of non-magnetic material. This allows the magnetic lines of force to penetrate into the gun assembly 11, thereby increasing the focusing characteristic of the electron gun and also, because the electrons are traveling substantially parallel to the magnetic field disposed between the region from the cathode 68 to the anode 41 less noise is produced in the system. The beam rapidly spreads after it passes through aperture 74. Since aperture 74 is small, the magnetic field therein is substantially transverse and there is no or very little magnetic field in the collector. Though the beam spreads, the collector must still be cooled by a series of radial fins 76 which are oriented circumferentially around the anode. The fins 76 may be either a series of thin washers, brazed to the collector, or a thin member helically wound around and brazed to the collector. The fins are enclosed by a cylindrical member 77 which has four openings 78 extending its full length and disposed at 90° intervals around the member 77. Cooling air is introduced into two diametrically opposed openings 78 and exhausted through the remaining two openings. This arrangement provides a multitude of short paths for the cooling air and consequently the amount of energy necessary to drive the cooling air is low. Member 77 may be made of magnetic material to further bypass the magnetic field from the collector.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a high frequency tube apparatus, an electron gun for producing an electron beam, a collector for collecting said electron beam and a high frequency interaction means positioned between said gun and said collector, said high frequency interaction means comprising at least one tunable cavity resonator having a flexible wall disposed parallel to the beam axis, said flexible wall comprising a metallic sheet, a heat sink disposed on said metallic sheet, and means for removing heat from said heat sink, said heat sink comprising a metallic bar disposed on the remote side of said flexible wall from said beam axis and aligned substantially perpendicular to said beam axis, said means for removing heat from said metallic bar heat sink comprising at least one thin flexible member affixed at one end portion thereof to said bar and affixed at another end portion thereof to an extension of said cavity end walls.

2. In a high frequency tube apparatus, an electron gun for producing an electron beam, a collector for collecting said electron beam, and a high frequency interaction means positioned between said gun and said collector along the axis of said electron beam comprising a plurality of tunable cavity resonators each of said resonators having a flexible wall disposed substantially parallel to the axis of said beam, said flexible walls comprising a metallic sheet extending across said interaction means and bonded to the transverse defining end walls of the cavity resonators thereby forming said flexible wall for each of said pair of tunable cavity resonators, a heat sink disposed on said metallic sheet between the end walls of each of said pair of tunable cavity resonators, and means for removing heat from said heat sinks, said adjacent tunable cavity resonators having a common end wall, said heat sink comprising a metallic bar disposed on the remote side of said sheet of said beam axis, a metallic spacer bonded on said sheet opposite each end wall of said resonators, and said means for removing heat from said heat sink comprising a second thin metallic sheet bonded to each of said spacers and said metallic bar.

3. The apparatus as defined in claim 2 wherein said sheets are thinner at their areas between said spacers and said bars than at their areas which are bonded to said spacers and said bars.

References Cited by the Examiner

UNITED STATES PATENTS

| | | | |
|---|---|---|---|
| 2,523,031 | 9/1950 | Lafferty | 313—46 |
| 2,606,302 | 8/1952 | Learned | 315—5.48 |
| 2,915,670 | 12/1959 | Zitelli | 315—5.48 |
| 3,121,205 | 2/1964 | Foss | 333—83 |
| 3,167,968 | 2/1965 | Sandstrom | 315—5.48 |

HERMAN KARL SAALBACH, *Primary Examiner.*

S. D. CHATMON, Jr., *Assistant Examiner.*